Patented July 9, 1935

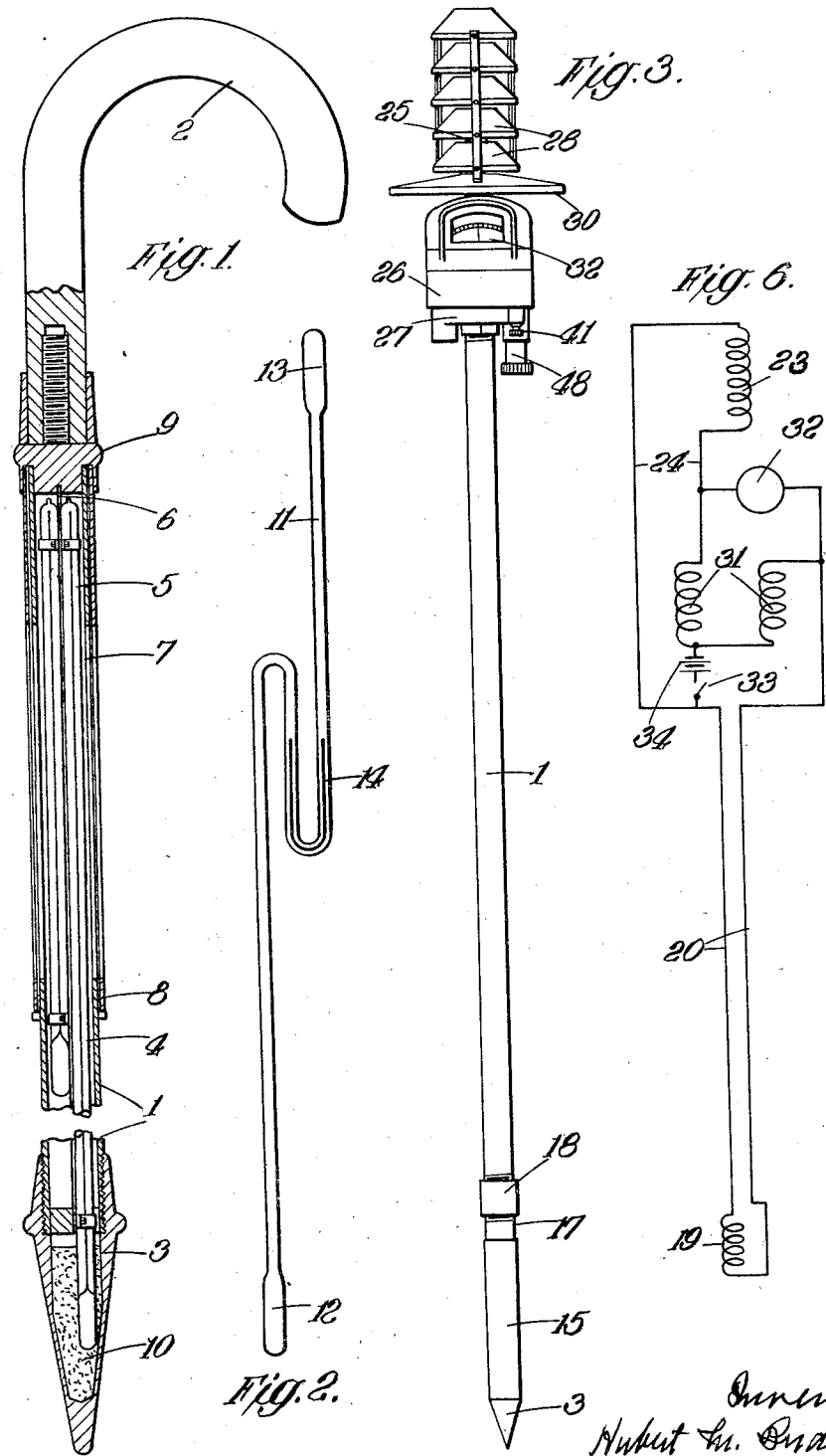

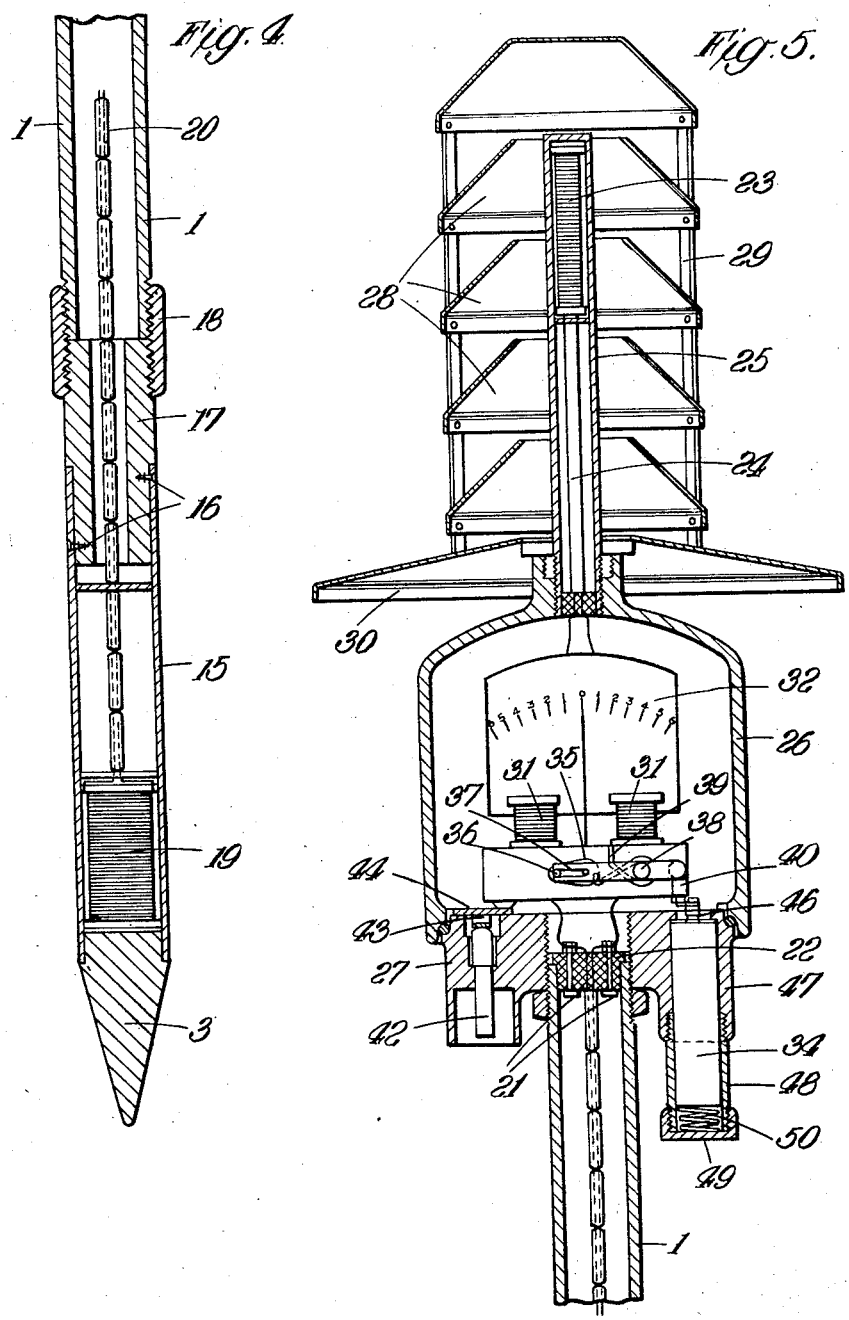

2,007,324

UNITED STATES PATENT OFFICE 2,007,324

MEANS FOR INDICATING SCENT CONDITIONS

Hubert Maitland Budgett, Kirtlington Park, Oxford, England

Application August 9, 1933, Serial No. 684,467
In Great Britain August 12, 1932

8 Claims. (Cl. 73—32)

The present invention relates to means for indicating scent conditions, that is to say, whether the scent left by a quarry will be readily detectable by a dog or other animal in search of its track.

An indication of scent conditions can be obtained, at a given time and place by ascertaining whether there is a tendency for an air current to rise from or flow toward the surface of the earth.

It has been found that under the former conditions the scent may be readily picked up and followed, while under the latter conditions it is much more difficult for the scent to be traced.

Generally speaking the most potent factor determining the direction of air currents toward or away from the earth's surface is the relation between the temperatures respectively of the earth and of the air above it, and, therefore, comparison of such temperatures forms a ready manner, according to the present invention, of determining the direction of such air currents. It may be mentioned that when the earth is warmer than the air, the air will flow from the earth upwards and when the earth is cooler than the air the air will be drawn downwards into the earth. It is the object of the present invention to provide an apparatus whereby the temperatures of the earth and of the air above it can be readily ascertained. In order that the invention may be more completely understood and readily carried into effect, various forms of apparatus adapted to enable such temperature comparison to be made are illustrated by way of example in the accompanying drawings wherein:—

Figure 1 illustrates in longitudinal section a form of apparatus somewhat in the form of an ordinary walking stick adapted to be thrust into the ground and provided with thermometers to indicate respectively the temperatures under and above the earth's surface which may be readily compared.

Figure 2 depicts somewhat diagrammatically a form of differential thermometer which might be employed in a device of the walking-stick form depicted in Figure 1, Figure 3 illustrates in outside elevation a form of apparatus wherein the temperatures under and above the surface of the earth are compared electrically, Figures 4 and 5 respectively illustrate in longitudinal section and to an enlarged scale portions of the apparatus shown in Figure 3, Figure 6 is a diagram showing the connections of the electrical elements employed in the apparatus depicted in Figures 3, 4 and 5.

The device shown in Figure 1 comprises a metal tube 1 which may conveniently be provided with a crook handle 2 and is fitted with a point or spike 3 adapted to be thrust into the earth. The point or spike 3 is hollow for the purpose of receiving the bulb of a liquid-filled thermometer 4, the tube of which is made of sufficient length to extend through the greater part of the tube 1. A second liquid-filled thermometer 5 is located within the tube 1, being separated from the thermometer 4 by a partition 6. As indicated, the thermometer 5 is comparatively short so that its bulb is located well above the surface of the earth. Thus the thermometers 4 and 5 respectively indicate the temperatures below and above the earth's surface, and by comparing their readings the probability as to whether there is an air current toward or away from the earth's surface and, consequently whether the scent conditions are unfavourable or favourable may be determined. Preferably the amount of mercury or other liquid in, and the position of, each thermometer, as also the location of the scale readings, are such that the temperature may be read off near the upper end of the tube 1. The scale readings might, for example, conveniently be engraved on opposite sides of the partition 6. For the purpose of reading the thermometers, slots 7 are cut in the tube 1, and, surrounding that portion of the tube 1 at which these slots are located, is a cylindrical shield 8, having apertures corresponding to the slots 7 and adapted to be rotated around the tube by means of a knurled collar 9. Thus when the apparatus is not in use the slots 7 may be covered by the shield 8, so affording protection to the thermometers. Preferably, in order to guard against breakage, the bulb of the thermometer 4 is, as indicated, embedded in a block 10 of wax or other similar protective material.

Instead of employing two separate thermometers containing mercury or other liquid, a differential air thermometer, such as is depicted in Figure 2, may be used. This comprises a tube 11 bent, as indicated, to a double-U form and terminating at its ends in bulbs 12 and 13 respectively. The tube with its bulbs may be mounted in a hollow walking-stick-like device, such as above described, and, in the portion of the tube 11 of upright U form, mercury or other liquid 14 is placed. The pressures of the air or gas contained in the bulbs 12 and 13 are so adjusted initially that, when the temperature of the apparatus is uniform, the mercury 14 stands at the same height in each limb of the U. It will be appreciated, however, that if the temperature of the bulb 12, which, when the apparatus is inserted in the earth, is below the surface, varies relatively to that of the bulb 13, which is located above the earth's surface, there would be corresponding variation in the position of the mercury, and according to whether the mercury rises in one limb or the other the scent conditions may be determined as favourable or unfavourable.

The apparatus illustrated in Figure 3, 4 and 5, again takes the form of a hollow tube 1 terminating in a point 3 adapted to be thrust into the earth. The point 3, instead of being directly attached to the tube 1, is fitted to an intermediate tube 15 attached by means of screws 16 to a bush 17, which may conveniently be of wood and which is united with the tube 1, by means of a screwed sleeve 18. Located within the tube 15 is an electrical coil 19, the wire of which is preferably of a material possessing a high resistance-temperature coefficient. The ends of this coil are connected by an insulated twin cable 20 with terminals 21, see Figure 5, mounted in an insulating block 22 located in the upper end of the tube 1. The point 3 is inserted sufficiently far into the ground to ensure that the coil 19 shall be well below the surface so that variation in its resistance may be employed to give an indication of the temperature conditions existing underground. For obtaining a similar indication of the temperature conditions above the ground, there is employed an electrical coil 23, preferably also of a material of high resistance-temperature coefficient and having leads 24. These elements are located in a tube 25, screwed into a casing 26 adapted to contain the apparatus hereinafter described and to the base 27 of which the tube 1 is screwed and fixed by means of a lock nut. In order to preserve the coil 23 from being unduly affected by the wind or by the direct rays of the sun, but at the same time to allow a free circulation of air around the tube 25, the latter is surrounded by a series of cowls 28 supported by uprights 29, fitted to a conical shield 30 adapted to afford some protection to the casing 26.

Any suitable means of comparing the relative resistances of the coils 19 and 23 may be adopted, but it is preferred to employ the Wheatstone bridge method of comparison as shown in Figure 6. To this end two standard coils 31, preferably of material having negligible resistance-temperature coefficient, are joined in Wheatstone bridge connection with a galvanometer 32, a switch 33 and battery 34, all these elements being contained within the casing 26 and its base 27. The galvanometer 32 may conveniently be of the well-known moving-coil type, and is provided with zero adjustment mechanism comprising a lever 35 mounted to rock about the axis of the moving element of the galvanometer and, by means of a torsion strip not shown, adapted to exercise a restoring force on the said moving element. The lever 35 is fitted with a pin 36 embraced by a slot in a lever 37 pivoted at 38 and biased by a spring 39, so as to maintain the end of the lever 37 opposite to that in which the slot is formed in contact with a stud 40 screwed through the base 27 and provided, as shown in Figure 3, with an external knurled head 41 for the purpose of zero adjustment. As seen in Figure 5, the switch 33 comprises a plunger 42 projecting through the base 27 and adapted, on manual operation, to bring a metal member 43 into contact with a stationary metal member 44, or, on release, to allow them to separate owing to the resilience of the member 43. The battery 34 may conveniently be the well-known form of dry battery having at one end contacts 46 adapted to bear on complementary insulated contacts suitably mounted on the base 27. As indicated in Figure 5, the battery is conveniently located in a hollow boss 47 of the base 27 into which there is screwed a short tube 48 provided with a screw cap 49 adapted to retain the battery 34 in position by means of an interposed spring 50.

What I claim and desire to secure by Letters Patent of the United States is:—

1. Apparatus for indicating scent conditions along the surface of the earth comprising a casing, the lower end of which is constructed for thrusting into the earth, a temperature responsive element in the lower end of said casing and adapted to be located beneath the earth's surface when the casing is thrust in the earth, a temperature responsive element at a higher level in said casing and adapted to be located above the earth's surface when the casing is thrust in the earth and means for indicating temperature variations in the said elements.

2. Apparatus for indicating scent conditions along the surface of the earth comprising a tube one end of which is constructed to be thrust into the earth and two thermometers within said tube and having their bulbs respectively located at the end of the tube constructed to be thrust into the earth and at a higher level in said tube so that one may be located beneath and the other above the earth's surface when the said tube is thrust into the earth.

3. Apparatus as in claim 2, comprising tubes respectively in communication with said bulbs and containing liquid, the liquid-containing portion of one of said tubes being longer than that of the other of said tubes, and scales for reading the position of the liquid in said tubes located at substantially the same distance from either end of said enclosing tube.

4. Apparatus for indicating scent conditions along the surface of the earth comprising a tube constructed to be thrust into the earth and two thermometers within said tube and having their bulbs respectively located at different distances from one end of said tube so that one bulb may be located beneath and the other above the earth's surface when said tube is thrust into the earth, said tube having slots for observation of the liquid level in said thermometers.

5. Apparatus for indicating scent conditions along the surface of the earth comprising a tube constructed to be thrust into the earth, two thermometers within said tube and having their bulbs respectively located at different distances from one end of said tube so that one bulb may be located beneath and the other above the earth's surface when said tube is thrust into the earth, said tube having slots for observation of the liquid level in said thermometers, and a cylindrical shield surrounding the portion of said tube wherein said slots are situated and having complementary slots and capable of rotation around said tube.

6. Apparatus for indicating scent conditions along the surface of the earth comprising a tube the lower end of which is constructed for thrusting into the earth, an electrical coil constituting a temperature-responsive element in the lower end of said tube and adapted to be located beneath the earth's surface when the tube is thrust in the earth, means for supporting another electrical coil constituting another temperature-responsive element at a higher level relatively to said tube and adapted to be located above the earth's surface when the tube is thrust in the earth and means for indicating temperature variations in said coils, said coils being made of material the resistance of which is variable with temperature.

7. Apparatus as in claim 6, wherein a casing is attached to said tube and means are provided with said casing for comparing the resistances of said coils, connections from said coils to said comparing means, said second mentioned coil being located in a second tube attached to the said casing.

8. Apparatus as in claim 6, wherein a casing is provided attached to said tube, said casing having therein elements of a Wheatstone bridge circuit namely, two resistance coils respectively forming two arms of the bridge, a galvanometer and a battery, connections from said coils to said temperature-responsive elements and a second tube attached to said casing and containing the second mentioned temperature-responsive element.

HUBERT MAITLAND BUDGETT.